United States Patent
Natanzon et al.

(10) Patent No.: US 10,725,967 B1
(45) Date of Patent: Jul. 28, 2020

(54) CONTINUOUS DATA PROTECTION SNAPSHOTS

(71) Applicant: EMC Corporation, Hopkinton, MA (US)

(72) Inventors: Assaf Natanzon, Tel Aviv (IL); Jehuda Udi Shemer, Kfar Saba (IL)

(73) Assignee: EMC IP Holding Company LLC, Hopkinton, MA (US)

( * ) Notice: Subject to any disclaimer, the term of this patent is extended or adjusted under 35 U.S.C. 154(b) by 1094 days.

(21) Appl. No.: 14/501,245

(22) Filed: Sep. 30, 2014

(51) Int. Cl.
*G06F 16/11* (2019.01)

(52) U.S. Cl.
CPC ................... *G06F 16/128* (2019.01)

(58) Field of Classification Search
CPC ........................ G06F 11/1469; G06F 16/128
USPC ........................................................ 707/639
See application file for complete search history.

(56) References Cited

U.S. PATENT DOCUMENTS

| 8,521,694 B1* | 8/2013 | Natanzon | G06F 17/30017 707/649 |
| 8,839,426 B1* | 9/2014 | Brueckner | 726/22 |

* cited by examiner

Primary Examiner — Kimberly L Wilson
(74) Attorney, Agent, or Firm — Krishnendu Gupta; Dorothy Wu Chiang

(57) ABSTRACT

A system, method, and computer program product comprising receiving replicated IO direct to an image on a production site; wherein the replicated IO is a copy of IO for application to the image on the production site, storing the replicated IO in a differential structure in a journal, processing the IO on the image on the replication site, and periodically processing the differential structure to be become a differential snapshot; wherein the differential snapshot may be used by a hypervisor to provide instant access to the point in time corresponding to the differential snapshot.

18 Claims, 16 Drawing Sheets

CONTINUOUS DATA PROTECTION SNAPSHOTS

A portion of the disclosure of this patent document may contain command formats and other computer language listings, all of which are subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

TECHNICAL FIELD

This invention relates to data replication.

BACKGROUND

Computer data is vital to today's organizations, and a significant part of protection against disasters is focused on data protection. As solid-state memory has advanced to the point where cost of memory has become a relatively insignificant factor, organizations can afford to operate with systems that store and process terabytes of data.

Conventional data protection systems include tape backup drives, for storing organizational production site data on a periodic basis. Such systems suffer from several drawbacks. First, they require a system shutdown during backup, since the data being backed up cannot be used during the backup operation. Second, they limit the points in time to which the production site can recover. For example, if data is backed up on a daily basis, there may be several hours of lost data in the event of a disaster. Third, the data recovery process itself takes a long time.

Another conventional data protection system uses data replication, by creating a copy of the organization's production site data on a secondary backup storage system, and updating the backup with changes. The backup storage system may be situated in the same physical location as the production storage system, or in a physically remote location. Data replication systems generally operate either at the application level, at the file system level, at the hypervisor level or at the data block level.

Current data protection systems try to provide continuous data protection, which enable the organization to roll back to any specified point in time within a recent history. Continuous data protection systems aim to satisfy two conflicting objectives, as best as possible; namely, (i) minimize the down time, in which the organization production site data is unavailable, during a recovery, and (ii) enable recovery as close as possible to any specified point in time within a recent history.

Continuous data protection typically uses a technology referred to as "journaling," whereby a log is kept of changes made to the backup storage. During a recovery, the journal entries serve as successive "undo" information, enabling rollback of the backup storage to previous points in time. Journaling was first implemented in database systems, and was later extended to broader data protection.

One challenge to continuous data protection is the ability of a backup site to keep pace with the data transactions of a production site, without slowing down the production site. The overhead of journaling inherently requires several data transactions at the backup site for each data transaction at the production site. As such, when data transactions occur at a high rate at the production site, the backup site may not be able to finish backing up one data transaction before the next production site data transaction occurs. If the production site is not forced to slow down, then necessarily a backlog of un-logged data transactions may build up at the backup site. Without being able to satisfactorily adapt dynamically to changing data transaction rates, a continuous data protection system chokes and eventually forces the production site to shut down.

SUMMARY

A system, method, and computer program product comprising receiving replicated IO direct to an image on a production site; wherein the replicated IO is a copy of IO for application to the image on the production site, storing the replicated IO in a differential structure in a journal, processing the IO on the image on the replication site, and periodically processing the differential structure to be become a differential snapshot; wherein the differential snapshot may be used by a hypervisor to provide instant access to the point in time corresponding to the differential snapshot.

BRIEF DESCRIPTION OF THE DRAWINGS

Objects, features, and advantages of embodiments disclosed herein may be better understood by referring to the following description in conjunction with the accompanying drawings. The drawings are not meant to limit the scope of the claims included herewith. For clarity, not every element may be labeled in every figure. The drawings are not necessarily to scale, emphasis instead being placed upon illustrating embodiments, principles, and concepts. Thus, features and advantages of the present disclosure will become more apparent from the following detailed description of exemplary embodiments thereof taken in conjunction with the accompanying drawings in which:

DETAILED DESCRIPTION

Figure 1:
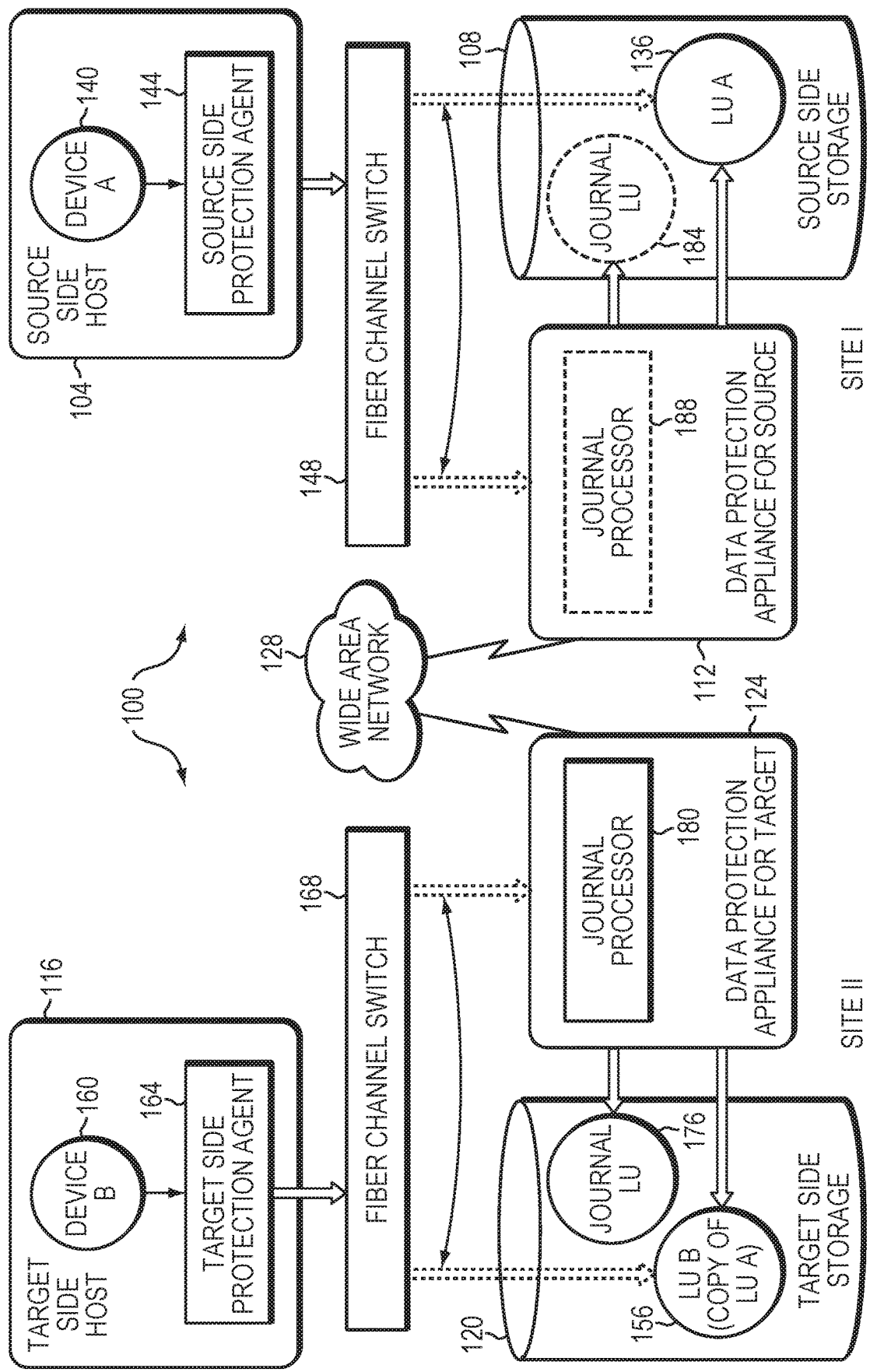
FIG. 1 is a simplified illustration of a data protection system, in accordance with an embodiment of the present disclosure.

In certain embodiments, it may be beneficial to replicate a virtual machine (VM) and the storage associated with a virtual machine. Typically, virtual replication may present complexity as there may not have been a way to access the IO for the virtual machine. In an embodiment of the current disclosure, a splitter may run in a virtualization layer in a hypervisor. In certain embodiments, a replication appliance may run in another virtual machine, which may run on the same physical machine or on another physical machine.

In certain embodiments, the current disclosure may enable replication in a virtual environment. In some embodiments, replication may be enabled at a virtual machine level. In most embodiments, the virtual machine may operate in a hypervisor. In at least one embodiment, the hypervisor may be a VMware hypervisor or ESX. In further embodiments, the hypervisor may be a Microsoft or Citrix hypervisor. In at least one embodiment, there may be a splitter, which may intercept IOs arriving at the virtual machine disk. In some embodiments, the Data Protection Appliance (DPA) may be located in the same hypervisor as the virtual machine. In other embodiments, the DPA may be located in a different hypervisor than the virtual machine.

In an embodiment, there may be a filter driver inside the virtualization layer. In certain embodiments, the filter driver may intercept the VM's IOs and may split the IO or redirect the IOs to provide replication. In certain embodiments, a splitter may communicate to a virtual appliance over ISCSI. In another embodiment, a virtual splitter may communicate to a virtual appliance using SCSI protocol over other medium like Fiber Channel, or (Fiber Channel over Ethernet (FCOE). In still other embodiments, a splitter may communicate to a virtual appliance using another protocol. In some embodiments, a virtual appliance may send IOs to a remote virtual appliance, which may write the data to a remote copy of the volume and to a journal. In certain embodiments, the journal may contain a redo log and undo log to allow point in time recovery.

In some embodiments, a virtual splitter may provide copy on write access to a point in time (TSP mode) by reading undo data from the backend volume writing it to a DPA or virtual data protection appliance (vDPA) and writing the data to the disk. In other embodiments, a virtual splitter may provide virtual access by redirecting IOs to a DPA or vDPA. In further embodiments, a virtual splitter may use a read before write protocol.

In certain embodiments, a replication system may have two components, a splitter and a replication appliance. In some embodiments, a splitter may intercept IOs flowing in a data path between a computer or VM and storage and may send the IO synchronously to a production replication appliance. In at least some embodiments, a replication appliance may replicate the IOs either synchronously or asynchronously to a replica site. In most embodiments, a splitting mechanism may add latency to write IOs as the IOs are sent synchronously to the replication appliance. In some embodiments, in virtual environments, a splitter may reside in a kernel of a hypervisor, and the replication appliance may be a virtual appliance.

In at least some embodiments, in a virtual environment, the user may have less control where a virtual appliances resides, as a virtual appliance may typically run on a different sever than the DPA due to availability issues and as multiple VMs may run on different hypervisor hosts and be replicated together in a single consistency group as they belong to the same application.

In some embodiments, a replication appliance may run on a loaded hypervisor server with a high response time delaying the VM's IOs. In other embodiments, a hypervisor cluster may be stretched over a distance and thus the response time for a virtual appliance that is a distance away from the splitter may be higher. In most embodiments, a splitter may connect to multiple replication appliances.

In many embodiments, a journal may contain the differences between a current replicated image and other images at previous points in time. In certain embodiments, herein, a point in time may refer to data stored in a particular volume, image or storage medium, at a given time. In some embodiments, when it is stated herein that an image is rolled or moved to a point in time, or a point in time is accessed, it may mean that an image representing the data contained by the image at that point in time is created or presented.

In certain embodiments, a journal may contain a snapshot differential or diff snap. In some embodiments a journal may contain a set of differential snapshots. In most embodiments, the differential snapshot may contain a set of differences between a current image and a point in time. In some embodiments, each differential snapshot may contain all the changes between the point in time of the differential snapshot and the current image. In other embodiments, if there are multiple differential snapshots, each differential file may contain the differences between it and the next closest snapshot file. In many embodiments, a journal may contain a differential structure, which may track IO being applied to a production site. In most embodiments, a data protection appliance (DPA) may be able to transform the differential structure into a differential snapshot. In certain embodiments, a data protection appliance may aggregate IO over a period of time and periodically transform a differential structure into a differential snapshot. In an embodiment, the IO changes may be aggregated in the memory of the DPA. In some embodiments, the IO changes may be aggregated in the journal. In many embodiments a hypervisor may also keep differential snapshots. In most embodiments the differential snapshot kept by a journal may be in the same format as the differential snapshot kept by a hypervisor. In certain embodiments, a hypervisor may be able to interchangeable use differential snapshots kept in a journal.

The following may be helpful in understanding the specification and claims:

BACKUP SITE—may be a facility where replicated production site data is stored; the backup site may be located in a remote site or at the same location as the production site; a backup site may be a virtual or physical site CLONE—a clone may be a copy or clone of the image or images, drive or drives of a first location at a second location;

DELTA MARKING STREAM—may mean the tracking of the delta between the production and replication site, which may contain the meta data of changed locations, the delta marking stream may be kept persistently on the journal at the production site of the replication, based on the delta marking data the DPA knows which locations are different between the production and the replica and transfers them to the replica to make both sites identical.

DPA—may be Data Protection Appliance a computer or a cluster of computers, or a set of processes that serve as a data protection appliance, responsible for data protection services including inter alia data replication of a storage system, and journaling of I/O requests issued by a host computer to the storage system; The DPA may be a physical device, a virtual device running, or may be a combination of a virtual and physical device.

RPA—may be replication protection appliance, is another name for DPA. An RPA may be a virtual DPA or a physical DPA.

HOST—may be at least one computer or networks of computers that runs at least one data processing application that issues I/O requests to one or more storage systems; a host is an initiator with a SAN; a host may be a virtual machine HOST DEVICE—may be an internal interface in a host, to a logical storage unit;

IMAGE—may be a copy of a logical storage unit at a specific point in time;

INITIATOR—may be a node in a SAN that issues I/O requests;

JOURNAL—may be a record of write transactions issued to a storage system; used to maintain a duplicate storage system, and to rollback the duplicate storage system to a previous point in time;

LOGICAL UNIT—may be a logical entity provided by a storage system for accessing data from the storage system;

LUN—may be a logical unit number for identifying a logical unit; may also refer to one or more virtual disks or virtual LUNs, which may correspond to one or more Virtual Machines. LUN may be used interchangeably with LU herein.

Management and deployment tools—may provide the means to deploy, control and manage the RP solution through the virtual environment management tools PHYSICAL STORAGE UNIT—may be a physical entity, such as a disk or an array of disks, for storing data in storage locations that can be accessed by address;

PRODUCTION SITE—may be a facility where one or more host computers run data processing applications that write data to a storage system and read data from the storage system; may be a virtual or physical site SAN—may be a storage area network of nodes that send and receive I/O and other requests, each node in the network being an initiator or a target, or both an initiator and a target;

SOURCE SIDE—may be a transmitter of data within a data replication workflow, during normal operation a production site is the source side; and during data recovery a backup site is the source side; may be a virtual or physical site SNAPSHOT—a Snapshot may refer to differential representations of an image, i.e. the snapshot may have pointers to the original volume, and may point to log volumes for changed locations. Snapshots may be combined into a snapshot array, which may represent different images over a time period. As used herein, in certain embodiments, a differential snapshot may be a snapshot that contains differences between a point in time and a current image. As used herein in different embodiments, a differential snapshot may be snapshot that contains differences between a point in time and a snapshot of a next closest point in time.

STORAGE SYSTEM—may be a SAN entity that provides multiple logical units for access by multiple SAN initiators TARGET—may be a node in a SAN that replies to I/O requests;

TARGET SIDE—may be a receiver of data within a data replication workflow; during normal operation a back site is the target side, and during data recovery a production site is the target side; may be a virtual or physical site WAN—may be a wide area network that connects local networks and enables them to communicate with one another, such as the Internet.

SPLITTER/PROTECTION AGENT: may be an agent running either on a production host a switch or a storage array which can intercept IO and split them to a DPA and to the storage array, fail IO redirect IO or do any other manipulation to the IO; the splitter or protection agent may be used in both physical and virtual systems. The splitter may be in the IO stack of a system and may be located in the hypervisor for virtual machines.

VIRTUAL VOLUME: may be a volume which is exposed to host by a virtualization layer, the virtual volume may be spanned across more than one site and or volumes VASA: may be a set of vCenter providers that allow an administrator to manage storage Virtualization filter appliance (VFA): may be a layer in the hypervisor that has the ability intercepts and split IO from a VM being written to a virtual disk. In some embodiments, the VFA may be running on a VM in a hypervisor This is an out of mechanism that allows storage management over web based APIs.

VVOL-filter—may be a VM utilizing a specialized Virtual machine, which may provide an infrastructure that allows for introducing a "device driver" into the virtualized IO stack provided by the Virtual machine Virtual RPA (vRPA)/Virtual DPA (vDPA): may be a data protection appliance (DPA) running in a VM.

VASA may be vSphere Storage application program interfaces (APIs) for Storage Awareness.

DISTRIBUTED MIRROR: may be a mirror of a volume across distance, either metro or geo, which is accessible at all sites.

BLOCK VIRTUALIZATION: may be a layer, which takes backend storage volumes and by slicing concatenation and striping create a new set of volumes, which serve as base volumes or devices in the virtualization layer MARKING ON SPLITTER: may be a mode in a splitter where intercepted IOs are not split to an appliance and the storage, but changes (meta data) are tracked in a list and/or a bitmap and I/O is immediately sent to down the IO stack.

FAIL ALL MODE: may be a mode of a volume in the splitter where all write and read IOs intercepted by the splitter are failed to the host, but other SCSI commands like read capacity are served.

GLOBAL FAIL ALL MODE: may be a mode of a volume in the virtual layer where all write and read IOs virtual layer are failed to the host, but other SCSI commands like read capacity are served.

LOGGED ACCESS: may be an access method provided by the appliance and the splitter, in which the appliance rolls the volumes of the consistency group to the point in time the user requested and let the host access the volumes in a copy on first write base.

VIRTUAL ACCESS: may be an access method provided by the appliance and the splitter, in which the appliance exposes a virtual volume from a specific point in time to the host, the data for the virtual volume is partially stored on the remote copy and partially stored on the journal.

CDP: Continuous Data Protection, may refer to a full replica of a volume or a set of volumes along with a journal which allows any point in time access, the CDP copy is at the same site, and maybe the same storage array of the production site CRR: Continuous Remote Replica may refer to a full replica of a volume or a set of volumes along with a journal which allows any point in time access at a site remote to the production volume and on a separate storage array.

A description of journaling and some techniques associated with journaling may be described in the patent titled METHODS AND APPARATUS FOR OPTIMAL JOURNALING FOR CONTINUOUS DATA REPLICATION and with U.S. Pat. No. 7,516,287, which is hereby incorporated by reference.

A discussion of image access may be found in U.S. patent application Ser. No. 12/969,903 entitled "DYNAMIC LUN RESIZING IN A REPLICATION ENVIRONMENT" filed on Dec. 16, 2010 assigned to EMC Corp., which is hereby incorporated by reference.

A discussion of journal based replication may be integrated with a virtual service layer. may be found in U.S. patent application Ser. Nos. 13/077,256, 13/077,262, and 13/077,266, entitled "CONSISTENT REPLICATION IN A GEOGRAPHICALLY DISPERSE ACTIVE ENVIRONMENT," "INVERSE STAR REPLICATION," and "NETWORKED BASED REPLICATION OF DISTRIBUTED VOLUMES," respectively, filed on Dec. 16, 2010 assigned to EMC Corp., which is hereby incorporated by reference.

A discussion of virtual replication may be may be found in U.S. patent application Ser. No. 13/599,492, entitled "MULTI SITE AND MULTI TENANCY," filed on Aug. 30, 2012 assigned to EMC Corp., which is hereby incorporated by reference.

A discussion of virtual replication may be found in U.S. patent application Ser. No. 13/534,042 entitled "VIRTUAL REPLICATION" filed on Jun. 27, 2012, and U.S. patent application Ser. No. 13/599,492 entitled "MULTI SITE AND MULTI TENANCY" filed on Aug. 30, 2012, both of which are assigned to EMC Corp and the contents and teachings of which are incorporated herein by reference in their entirety.

Description of Embodiments Using of a Five State Journaling Process

Reference is now made to FIG. 1, which is a simplified illustration of a data protection system 100, in accordance with an embodiment of the present invention. Shown in FIG. 1 are two sites; Site I, which is a production site, on the right, and Site II, which is a backup site, on the left. Under normal operation the production site is the source side of system 100, and the backup site is the target side of the system. The backup site is responsible for replicating production site data. Additionally, the backup site enables rollback of Site I data to an earlier point in time, which may be used in the event of data corruption of a disaster, or alternatively in order to view or to access data from an earlier point in time.

During normal operations, the direction of replicate data flow goes from source side to target side. It is possible, however, for a user to reverse the direction of replicate data flow, in which case Site I starts to behave as a target backup site, and Site II starts to behave as a source production site. Such change of replication direction is referred to as a "failover". A failover may be performed in the event of a disaster at the production site, or for other reasons. In some data architectures, Site I or Site II behaves as a production site for a portion of stored data, and behaves simultaneously as a backup site for another portion of stored data. In some data architectures, a portion of stored data is replicated to a backup site, and another portion is not.

The production site and the backup site may be remote from one another, or they may both be situated at a common site, local to one another. Local data protection has the advantage of minimizing data lag between target and source, and remote data protection has the advantage is being robust in the event that a disaster occurs at the source side.

The source and target sides communicate via a wide area network (WAN) 128, although other types of networks are also adaptable for use with the present invention.

In accordance with an embodiment of the present invention, each side of system 100 includes three major components coupled via a storage area network (SAN); namely, (i) a storage system, (ii) a host computer, and (iii) a data protection appliance (DPA). Specifically with reference to FIG. 1, the source side SAN includes a source host computer 104, a source storage system 108, and a source DPA 112. Similarly, the target side SAN includes a target host computer 116, a target storage system 120, and a target DPA 124.

Generally, a SAN includes one or more devices, referred to as "nodes". A node in a SAN may be an "initiator" or a "target", or both. An initiator node is a device that is able to initiate requests to one or more other devices; and a target node is a device that is able to reply to requests, such as SCSI commands, sent by an initiator node. A SAN may also include network switches, such as fiber channel switches. The communication links between each host computer and its corresponding storage system may be any appropriate medium suitable for data transfer, such as fiber communication channel links.

In an embodiment of the present invention, the host communicates with its corresponding storage system using small computer system interface (SCSI) commands.

System 100 includes source storage system 108 and target storage system 120. Each storage system includes physical storage units for storing data, such as disks or arrays of disks. Typically, storage systems 108 and 120 are target nodes. In order to enable initiators to send requests to storage system 108, storage system 108 exposes one or more logical units (LU) to which commands are issued. Thus, storage systems 108 and 120 are SAN entities that provide multiple logical units for access by multiple SAN initiators.

Logical units are a logical entity provided by a storage system, for accessing data stored in the storage system. A logical unit is identified by a unique logical unit number (LUN). In an embodiment of the present invention, storage system 108 exposes a logical unit 136, designated as LU A, and storage system 120 exposes a logical unit 156, designated as LU B.

In an embodiment of the present invention, LU B is used for replicating LU A. As such, LU B is generated as a copy of LU A. In one embodiment, LU B is configured so that its size is identical to the size of LU A. Thus for LU A, storage system 120 serves as a backup for source side storage system 108. Alternatively, as mentioned hereinabove, some logical units of storage system 120 may be used to back up logical units of storage system 108, and other logical units of storage system 120 may be used for other purposes. Moreover, in certain embodiments of the present invention, there is symmetric replication whereby some logical units of storage system 108 are used for replicating logical units of storage system 120, and other logical units of storage system 120 are used for replicating other logical units of storage system 108.

System 100 includes a source side host computer 104 and a target side host computer 116. A host computer may be one computer, or a plurality of computers, or a network of distributed computers, each computer may include inter alia a conventional CPU, volatile and non-volatile memory, a data bus, an I/O interface, a display interface and a network interface. Generally a host computer runs at least one data processing application, such as a database application and an e-mail server.

Generally, an operating system of a host computer creates a host device for each logical unit exposed by a storage system in the host computer SAN. A host device is a logical entity in a host computer, through which a host computer may access a logical unit. In an embodiment of the present invention, host device 104 identifies LU A and generates a corresponding host device 140, designated as Device A, through which it can access LU A. Similarly, host computer 116 identifies LU B and generates a corresponding device 160, designated as Device B.

In an embodiment of the present invention, in the course of continuous operation, host computer 104 is a SAN initiator that issues I/O requests (write/read operations) through host device 140 to LU A using, for example, SCSI commands. Such requests are generally transmitted to LU A with an address that includes a specific device identifier, an offset within the device, and a data size. Offsets are generally aligned to 512 byte blocks. The average size of a write operation issued by host computer 104 may be, for example, 10 kilobytes (KB); i.e., 20 blocks. For an I/O rate of 50 megabytes (MB) per second, this corresponds to approximately 5,000 write transactions per second.

System 100 includes two data protection appliances, a source side DPA 112 and a target side DPA 124. A DPA performs various data protection services, such as data replication of a storage system, and journaling of I/O requests issued by a host computer to source side storage system data. As explained in detail hereinbelow, when acting as a target side DPA, a DPA may also enable rollback of data to an earlier point in time, and processing of rolled back data at the target site. Each DPA 112 and 124 is a computer that includes inter alia one or more conventional CPUs and internal memory.

For additional safety precaution, each DPA is a cluster of such computers. Use of a cluster ensures that if a DPA computer is down, then the DPA functionality switches over to another computer. The DPA computers within a DPA cluster communicate with one another using at least one communication link suitable for data transfer via fiber channel or IP based protocols, or such other transfer protocol. One computer from the DPA cluster serves as the DPA leader. The DPA cluster leader coordinates between the computers in the cluster, and may also perform other tasks that require coordination between the computers, such as load balancing.

In the architecture illustrated in FIG. 1, DPA 112 and DPA 124 are standalone devices integrated within a SAN. Alternatively, each of DPA 112 and DPA 124 may be integrated into storage system 108 and storage system 120, respectively, or integrated into host computer 104 and host computer 116, respectively. Both DPAs communicate with their respective host computers through communication lines such as fiber channels using, for example, SCSI commands.

In accordance with an embodiment of the present invention, DPAs 112 and 124 are configured to act as initiators in the SAN; i.e., they can issue I/O requests using, for example, SCSI commands, to access logical units on their respective storage systems. DPA 112 and DPA 124 are also configured with the necessary functionality to act as targets; i.e., to reply to I/O requests, such as SCSI commands, issued by other initiators in the SAN, including inter alia their respective host computers 104 and 116. Being target nodes, DPA 112 and DPA 124 may dynamically expose or remove one or more logical units.

As described hereinabove, Site I and Site II may each behave simultaneously as a production site and a backup site for different logical units. As such, DPA 112 and DPA 124 may each behave as a source DPA for some logical units and as a target DPA for other logical units, at the same time.

In accordance with an embodiment of the present invention, host computer 104 and host computer 116 include protection agents 144 and 164, respectively. Protection agents 144 and 164 intercept SCSI commands issued by their respective host computers, via host devices to logical units that are accessible to the host computers. In accordance with an embodiment of the present invention, a data protection agent may act on an intercepted SCSI commands issued to a logical unit, in one of the following ways:

Send the SCSI commands to its intended logical unit.

Redirect the SCSI command to another logical unit.

Split the SCSI command by sending it first to the respective DPA. After the DPA returns an acknowledgement, send the SCSI command to its intended logical unit.

Fail a SCSI command by returning an error return code.

Delay a SCSI command by not returning an acknowledgement to the respective host computer.

A protection agent may handle different SCSI commands, differently, according to the type of the command. For example, a SCSI command inquiring about the size of a certain logical unit may be sent directly to that logical unit, while a SCSI write command may be split and sent first to a DPA associated with the agent. A protection agent may also change its behavior for handling SCSI commands, for example as a result of an instruction received from the DPA.

Specifically, the behavior of a protection agent for a certain host device generally corresponds to the behavior of its associated DPA with respect to the logical unit of the host device. When a DPA behaves as a source site DPA for a certain logical unit, then during normal course of operation, the associated protection agent splits I/O requests issued by a host computer to the host device corresponding to that logical unit. Similarly, when a DPA behaves as a target device for a certain logical unit, then during normal course of operation, the associated protection agent fails I/O requests issued by host computer to the host device corresponding to that logical unit.

Communication between protection agents and their respective DPAs may use any protocol suitable for data transfer within a SAN, such as fiber channel, or SCSI over fiber channel. The communication may be direct, or via a logical unit exposed by the DPA. In an embodiment of the present invention, protection agents communicate with their respective DPAs by sending SCSI commands over fiber channel.

In an embodiment of the present invention, protection agents 144 and 164 are drivers located in their respective host computers 104 and 116. Alternatively, a protection agent may also be located in a fiber channel switch 148, 168, or in any other device situated in a data path between a host computer and a storage system.

What follows is a detailed description of system behavior under normal production mode, and under recovery mode.

In accordance with an embodiment of the present invention, in production mode DPA 112 acts as a source site DPA for LU A. Thus, protection agent 144 is configured to act as a source side protection agent; i.e., as a splitter for host device A. Specifically, protection agent 144 replicates SCSI I/O requests. A replicated SCSI I/O request is sent to DPA 112. After receiving an acknowledgement from DPA 124, protection agent 144 then sends the SCSI I/O request to LU A. Only after receiving a second acknowledgement from storage system 108 may host computer 104 initiate another I/O request.

When DPA 112 receives a replicated SCSI write request from data protection agent 144, DPA 112 transmits certain I/O information characterizing the write request, packaged as a "write transaction", over WAN 128 to DPA 124 on the target side, for journaling and for incorporation within target storage system 120.

DPA 112 may send its write transactions to DPA 124 using a variety of modes of transmission, including inter alia (i) a synchronous mode, (ii) an asynchronous mode, and (iii) a snapshot mode. In synchronous mode, DPA 112 sends each write transaction to DPA 124, receives back an acknowledgement from DPA 124, and in turns sends an acknowledgement back to protection agent 144. Protection agent 144 waits until receipt of such acknowledgement before sending the SCSI write request to LU A.

In asynchronous mode, DPA 112 sends an acknowledgement to protection agent 144 upon receipt of each I/O request, before receiving an acknowledgement back from DPA 124.

In snapshot mode, DPA 112 receives several I/O requests and combines them into an aggregate "snapshot" of all write activity performed in the multiple I/O requests, and sends the snapshot to DPA 124, for journaling and for incorporation in target storage system 120. In snapshot mode DPA 112 also sends an acknowledgement to protection agent 144 upon receipt of each I/O request, before receiving an acknowledgement back from DPA 124.

For the sake of clarity, the ensuing discussion assumes that information is transmitted at write-by-write granularity.

While in production mode, DPA 124 receives replicated data of LU A from DPA 112, and performs journaling and writing to storage system 120. When applying write operations to storage system 120, DPA 124 acts as an initiator, and sends SCSI commands to LU B.

During a recovery mode, DPA 124 undoes the write transactions in the journal, so as to restore storage system 120 to the state it was at, at an earlier time.

As described hereinabove, in accordance with an embodiment of the present invention, LU B is used as a backup of LU A. As such, during normal production mode, while data written to LU A by host computer 104 is replicated from LU A to LU B, host computer 116 should not be sending I/O requests to LU B. To prevent such I/O requests from being sent, protection agent 164 acts as a target site protection agent for host Device B and fails I/O requests sent from host computer 116 to LU B through host Device B.

In accordance with an embodiment of the present invention, target storage system 120 exposes a logical unit 176, referred to as a "journal LU", for maintaining a history of write transactions made to LU B, referred to as a "journal". Alternatively, journal LU 176 may be striped over several logical units, or may reside within all of or a portion of another logical unit. DPA 124 includes a journal processor 180 for managing the journal. Similarly and in alternate embodiments, storage side storage system 108 exposes a logical unit 184, referred to as a "journal LU", for maintaining a history of write transactions made to LU A, referred to as a "journal". Alternatively, journal LU 184 may be striped over several logical units, or may reside within all of or a portion of another logical unit. DPA 112 includes a journal processor 188 for managing the journal.

Journal processor 180 functions generally to manage the journal entries of LU B. Similarly, journal processor 188 functions generally to manage journal entries of LU A. Specifically, journal processor 180 (i) enters write transactions received by DPA 124 from DPA 112 into the journal, by writing them into the journal LU, (ii) applies the journal transactions to LU B, and (iii) updates the journal entries in the journal LU with undo information and removes already-applied transactions from the journal. As described below, with reference to FIGS. 2 and 3A-3D, journal entries include four streams, two of which are written when write transaction are entered into the journal, and two of which are written when write transaction are applied and removed from the journal.

Figure 2:
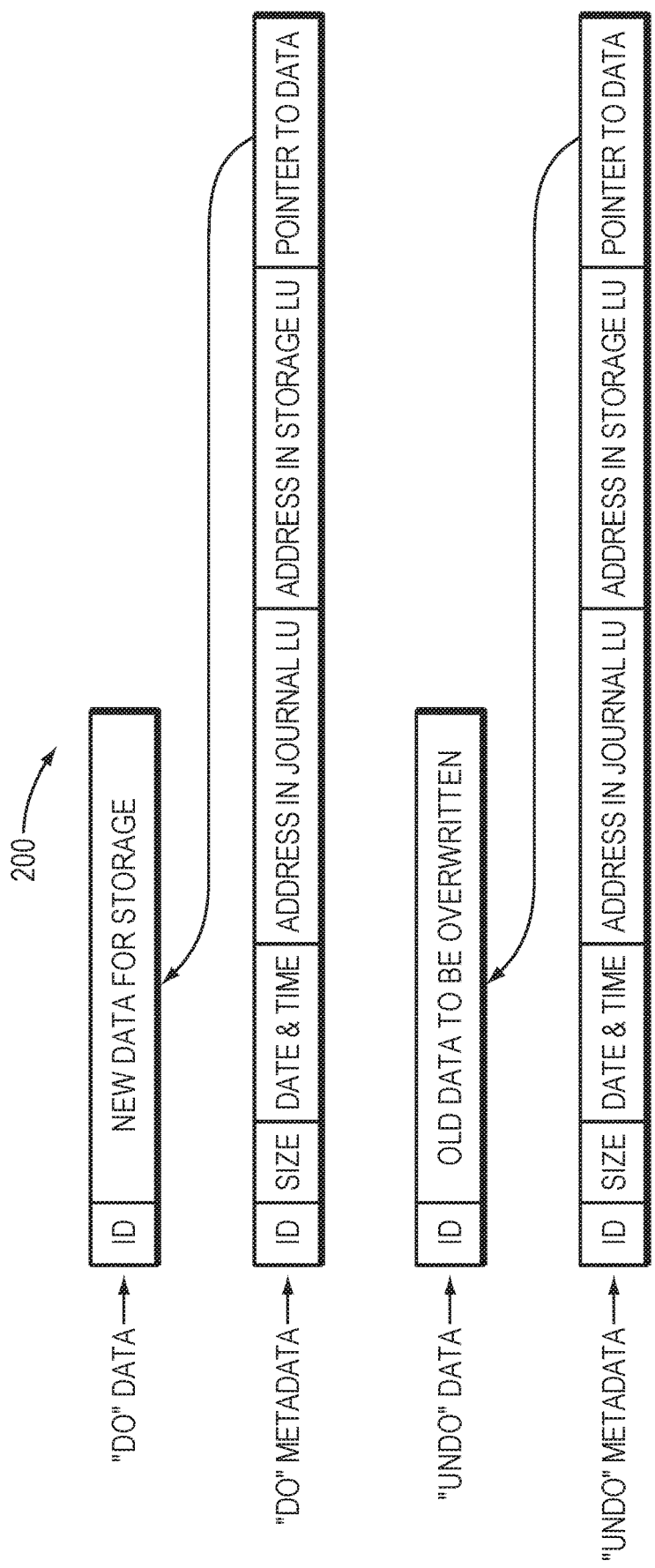
FIG. 2 is a simplified illustration of a write transaction for a journal, in accordance with an embodiment of the present disclosure.

Reference is now made to FIG. 2, which is a simplified illustration of a write transaction 200 for a journal, in accordance with an embodiment of the present invention. The journal may be used to provide an adaptor for access to storage 120 at the state it was in at any specified point in time. Since the journal contains the "undo" information necessary to rollback storage system 120, data that was stored in specific memory locations at the specified point in time may be obtained by undoing write transactions that occurred subsequent to such point in time.

Write transaction 200 generally includes the following fields:

one or more identifiers;

a time stamp, which is the date & time at which the transaction was received by source side DPA 112;

a write size, which is the size of the data block;

a location in journal LU 176 where the data is entered;

a location in LU B where the data is to be written; and the data itself.

Write transaction 200 is transmitted from source side DPA 112 to target side DPA 124. As shown in FIG. 2, DPA 124 records the write transaction 200 in four streams. A first stream, referred to as a DO stream, includes new data for writing in LU B. A second stream, referred to as an DO METADATA stream, includes metadata for the write transaction, such as an identifier, a date & time, a write size, a beginning address in LU B for writing the new data in, and a pointer to the offset in the do stream where the corresponding data is located. Similarly, a third stream, referred to as an UNDO stream, includes old data that was overwritten in LU B; and a fourth stream, referred to as an UNDO METADATA, include an identifier, a date & time, a write size, a beginning address in LU B where data was to be overwritten, and a pointer to the offset in the undo stream where the corresponding old data is located.

In practice each of the four streams holds a plurality of write transaction data. As write transactions are received dynamically by target DPA 124, they are recorded at the end of the DO stream and the end of the DO METADATA stream, prior to committing the transaction. During transaction application, when the various write transactions are applied to LU B, prior to writing the new DO data into addresses within the storage system, the older data currently located in such addresses is recorded into the UNDO stream.

By recording old data, a journal entry can be used to "undo" a write transaction. To undo a transaction, old data is read from the UNDO stream in a reverse order, from the most recent data to the oldest data, for writing into addresses within LU B. Prior to writing the UNDO data into these addresses, the newer data residing in such addresses is recorded in the DO stream.

The journal LU is partitioned into segments with a pre-defined size, such as 1 MB segments, with each segment identified by a counter. The collection of such segments forms a segment pool for the four journaling streams described hereinabove. Each such stream is structured as an ordered list of segments, into which the stream data is written, and includes two pointers—a beginning pointer that points to the first segment in the list and an end pointer that points to the last segment in the list.

According to a write direction for each stream, write transaction data is appended to the stream either at the end, for a forward direction, or at the beginning, for a backward direction. As each write transaction is received by DPA 124, its size is checked to determine if it can fit within available segments. If not, then one or more segments are chosen from the segment pool and appended to the stream's ordered list of segments.

Thereafter the DO data is written into the DO stream, and the pointer to the appropriate first or last segment is updated. Freeing of segments in the ordered list is performed by simply changing the beginning or the end pointer. Freed segments are returned to the segment pool for re-use.

A journal may be made of any number of streams including less than or more than 5 streams. Often, based on the speed of the journaling and whether the back-up is synchronous or a synchronous a fewer or greater number of streams may be used.

Virtual CDP

In many embodiments, a journal may contain the differences between a current replicated image and one or more other images at one or more previous points in time. In certain embodiments, a journal may contain a snapshot differential or diff snap. In some embodiments a journal may contain a set of differential snapshots. In most embodiments the differential snapshot may contain a set of differences between a current image and a point in time. In some embodiments, each differential snapshot may contain all the changes between the point in time of the differential snapshot and the current image. In other embodiments, if there are multiple differential snapshots, each differential file may contain the differences between it and the next closest snapshot file. In many embodiments, a journal may contain a differential structure, which may track IO being applied to a production site. In most embodiments, a data protection appliance (DPA) may be able to transform the differential structure into a differential snapshot. In certain embodiments, a data protection appliance may aggregate IO over a period of time. In most embodiments, a differential structure may be periodically transformed into a differential snapshot. In an embodiment, the IO changes may be aggregated in the memory of the DPA. In some embodiments, the IO changes may be aggregated in the journal.

In certain embodiments, there may be a limit on the number of differential snapshots that may be stored by the hypervisor. In some embodiments, differential snapshots may be combined. In an embodiment, a DPA may combine differential snapshots. In other embodiments, a hypervisor may combine differential snapshots. In some embodiments, merging differential snapshots may create a new differential snapshot based on two other differential snapshots and may include the last changes in each location. In many embodiments, when differential snapshots are combined, the newer changes may be kept and the older changes may be discarded. In most embodiments, replication of IO to the production site may be continuous, but access to data images may be dictated by the available differential snapshots. In some embodiments, for each data location in the image, the differential snapshot may store one value. In some embodiments snapshot differential files may be hypervisor data structures. In certain embodiments, when an hypervisor creates a snapshot it may create a snapshot diff file. In most embodiments, if a journal is presented as snapshot differential files, the hypervisor may access a journal's PITs as native hypervisor snapshots.

Figure 3:
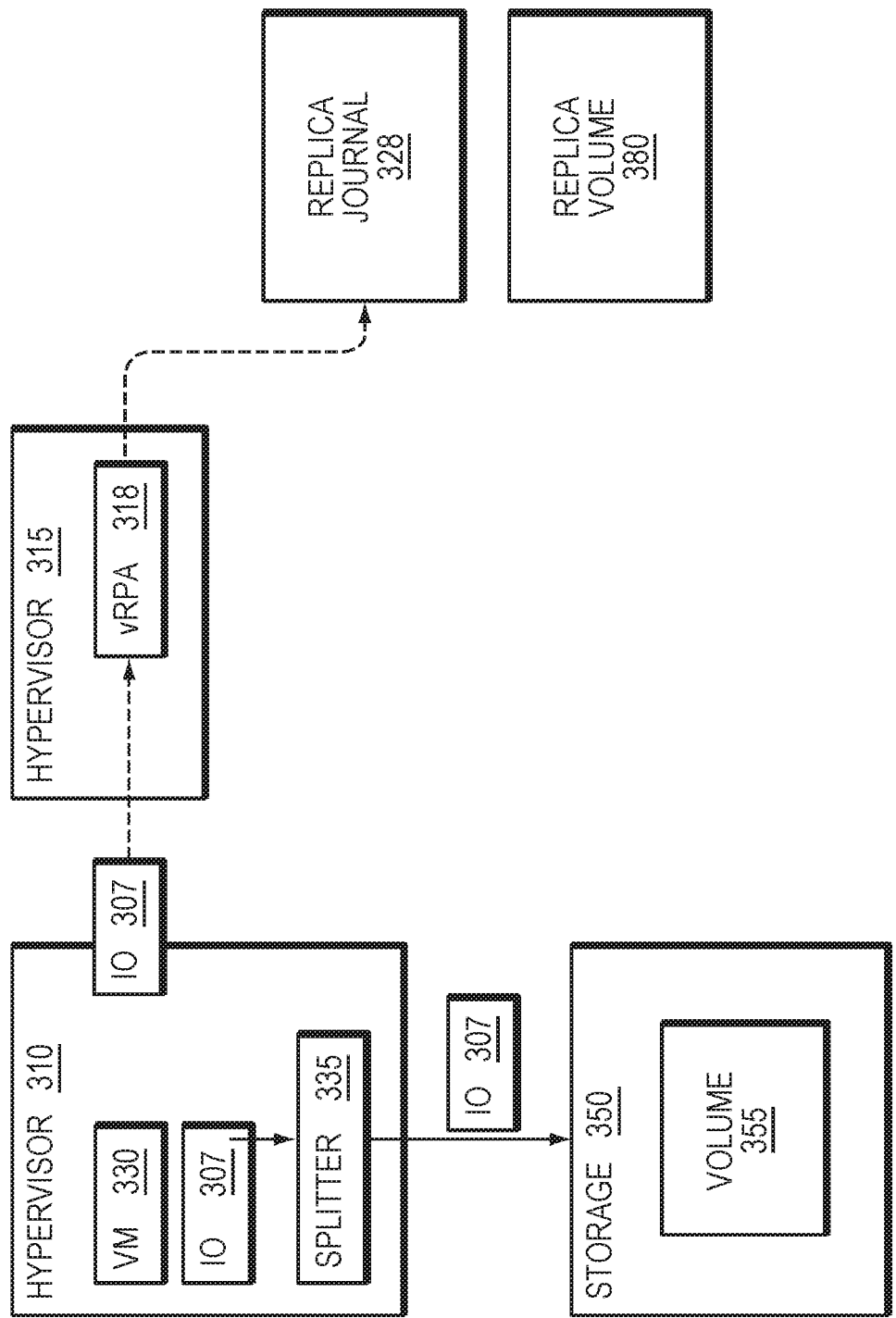
FIG. 3 is a simplified illustration of a hypervisor and replication appliance with an IO based journal, in accordance with an embodiment of the present disclosure.
Figure 4:
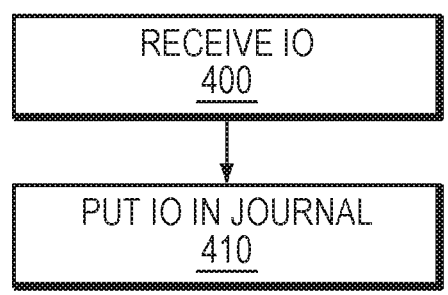
FIG. 4 is a simplified example of a method for receiving an IO an putting it into the journal, in accordance with an embodiment of the present disclosure.

Refer now to the example embodiments of FIGS. 3 and 4. In the example embodiment of FIG. 3, there are IO 307, hypervisor 310, hypervisor 315, replica journal 328, storage 350, and replica volume 380. Hypervisor 310 has VM 330, which generates IO 307, which gets intercepted by splitter 335. Splitter 335 sends a copy of IO 307 to VRPA 318 of hypervisor 315 (step 400). vRPA 318 sends a copy of IO 307 to replica journal 328 (step 410). Splitter 335 also sends IO 307 to Storage 350. Storage 350 sends IO to volume 355. Replica volume 380 is a replicated copy of volume 355.

In most embodiments, the journal of FIG. 3 may be that as described in FIG. 2, having a 5 stream journal including a do and undo journal. In other embodiments, the journal of FIG. 3 may be simplified to have less than 5 streams.

Figure 5:
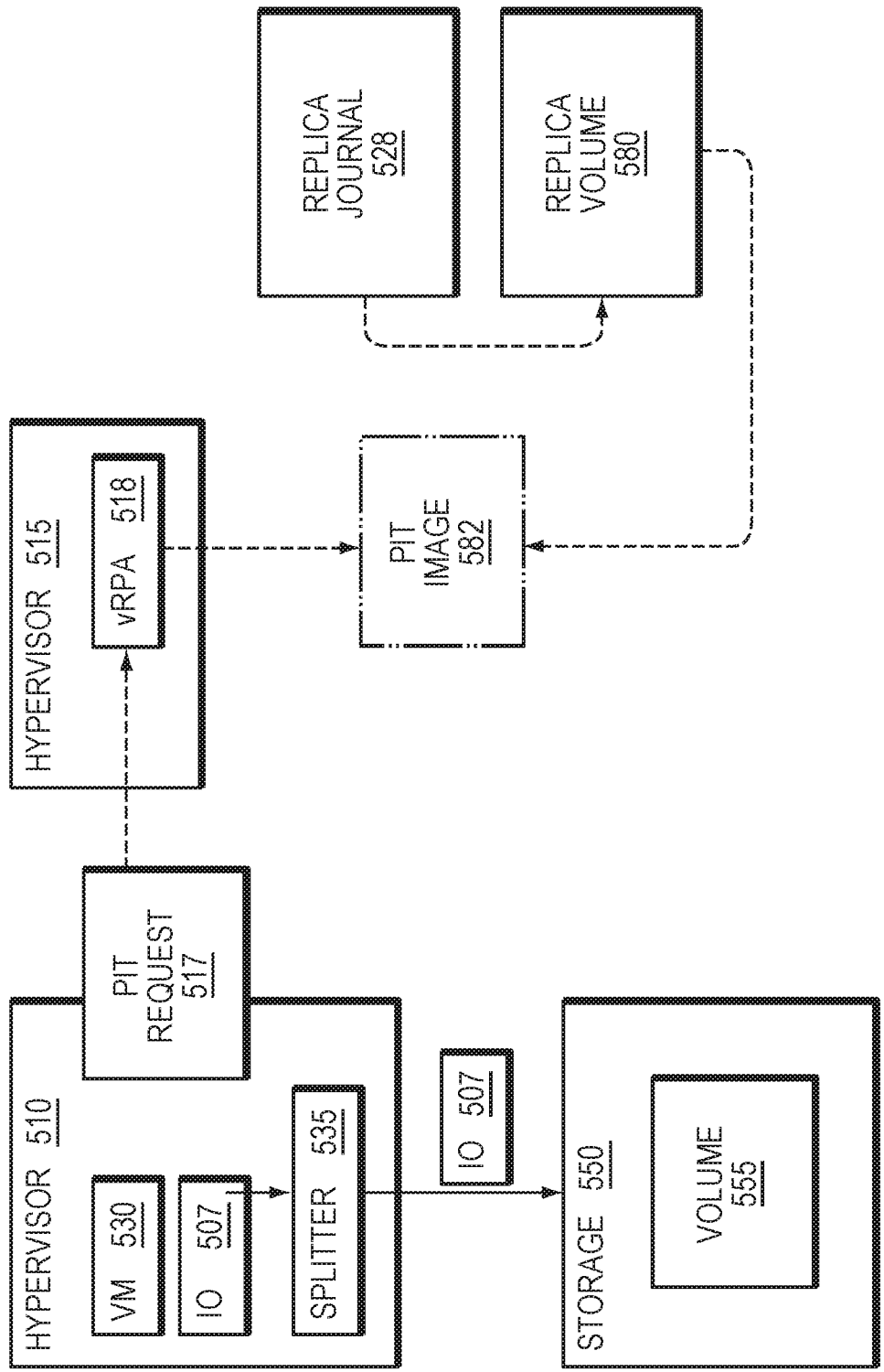
FIG. 5 is a simplified illustration of a receiving a request for and rolling an image to a point in time, in accordance with an embodiment of the present disclosure.
Figure 6:
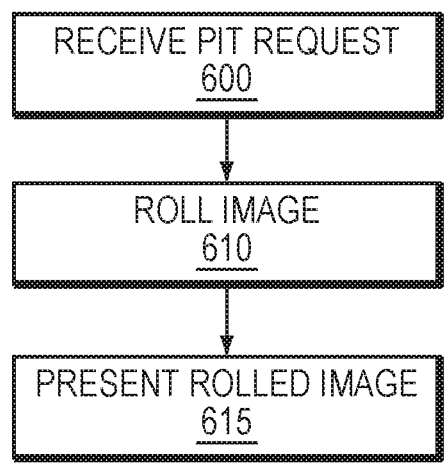
FIG. 6 is a simplified example of a method for rolling to a point in time, in accordance with an embodiment of the present disclosure.

Refer now to the example embodiments of FIGS. 5 and 6. In the example embodiment of FIG. 5, there are IO 507, hypervisor 510, hypervisor 515, replica journal 528, storage 550, and replica volume 580. Hypervisor 510 has VM 530, which generates IO 507, which gets intercepted by splitter 535. Splitter 535 sends a copy of IO 507 to VRPA 518 of hypervisor 515. vRPA 518 sends a copy of IO 507 to replica journal 528. Splitter 535 also sends IO 507 to Storage 550, which send to volume 555. vRPA 518 of Hypervisor 515 has received PIT request 517 (Step 600). vRPA 518 rolls Replica Volume 580 to PIT Image 582 using replica journal 528 (Step 610). The roll occurs by applying IO in replica journal 528 to move replica volume 580 to PIT Image 582 (Step 615).

In certain embodiments, it may take time to create PIT Image as IO from the Replica Journal is applied to move the current image to the requested image. In many embodiments, the roll described in FIGS. 5 and 6 may process or apply one or more of the journal streams to the current image to roll it to the requested point in time image.

Figure 7:
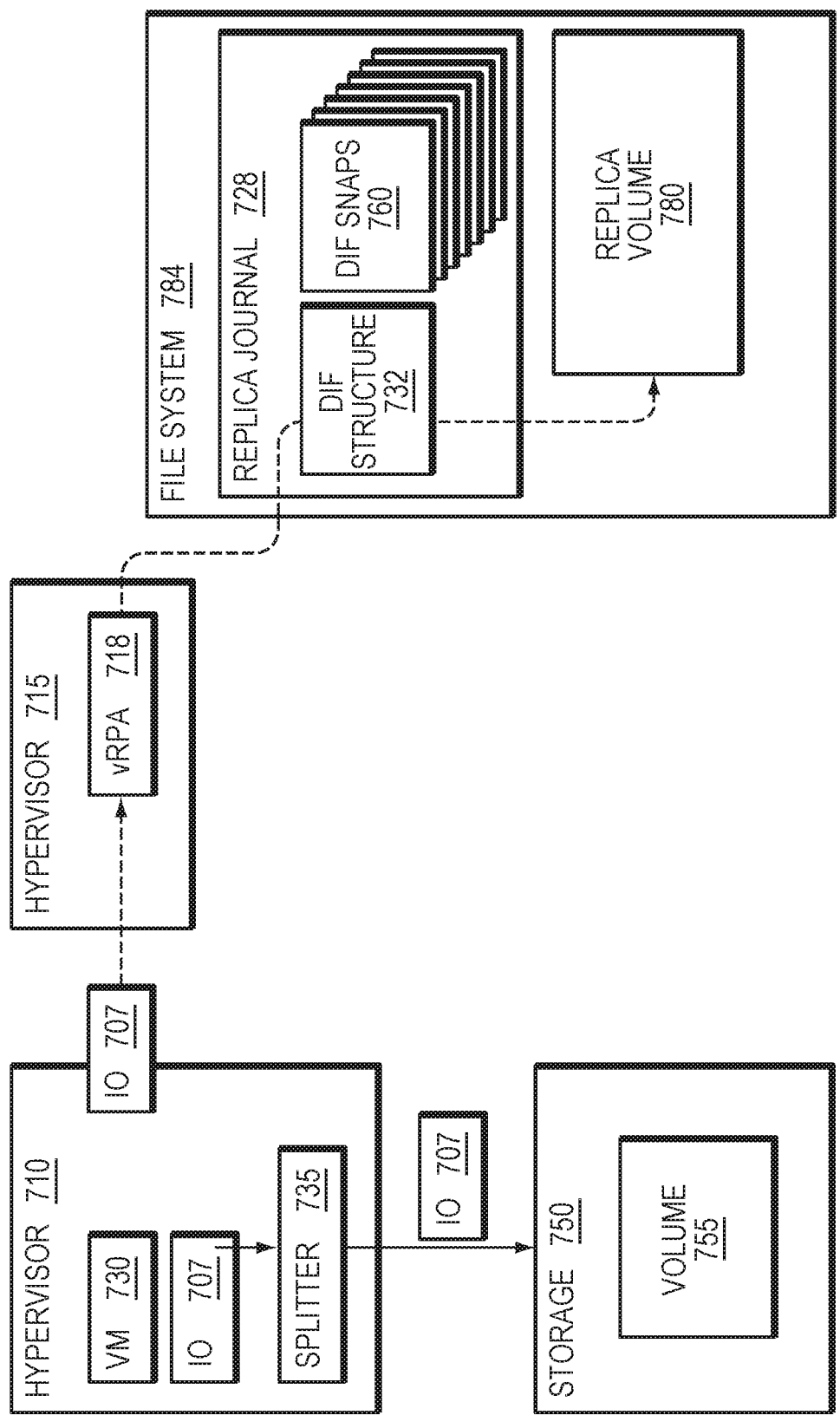
FIG. 7 is a simplified illustration of a hypervisor and replication appliance with a differential based journal, in accordance with an embodiment of the present disclosure.
Figure 8:
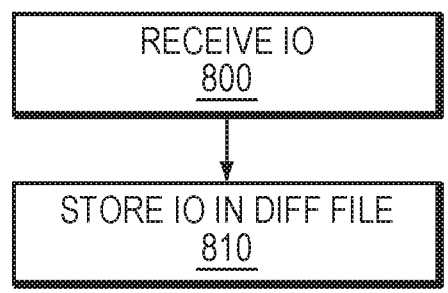
FIG. 8 is a simplified example of a method for receiving an IO an putting it into a journal, in accordance with an embodiment of the present disclosure.

Refer now to the example embodiments of FIGS. 7 and 8, which illustrate storing replicated IO in a diff structure. Hypervisor 710 has VM 730 which sends IO 707, which is intercepted by splitter 735. Splitter 735 sends a copy of IO 707 to vRPA 718 of Hypervisor 715. vRPA 718 sends IO to replication journal 728 (step 800) on File system 784 (for example VMFS or CSVFS), which stores the IO in diff structure 732 (step 810). In this embodiment, the may IO not be applied to replica volume 780, rather applying the IOs to the volume may be performed by merging diff files into the volume. Splitter 735 also sends IO 707 to storage 750 to be stored on volume 755. Also stored in replica journal are diff snaps 760. Diff snaps 760 represents snapshots of replica volume 780 through different points in time.

In certain embodiments, the journal of FIGS. 7 and 8 may be a differential type journal. In many embodiments, a difference journal may not list each change that has occurred to the production image in time, but may aggregate IOs over time to provide access to specific points of time and may not provide continuous access to every point in time. In most embodiments, diff snaps may represents snapshots containing the differences between the replica volume 780 at the current time and the point in time diff snap was created. In other embodiments, one or more of the snaps of the diff snaps may be a full snapshot of the image. In most embodiments, it may be possible to leverage a snap of the diff snaps and the replica volume to provide instant access to the points of time in the diff snaps. In many embodiments, the snap diffs may be kept in the format that the hypervisor stores its volume snapshots. In certain embodiments, the snap diff format may be that of the Microsoft® vhdx file format In other embodiments, the snap diff format may be the format of the VMware® hypervisor.

Figure 9:
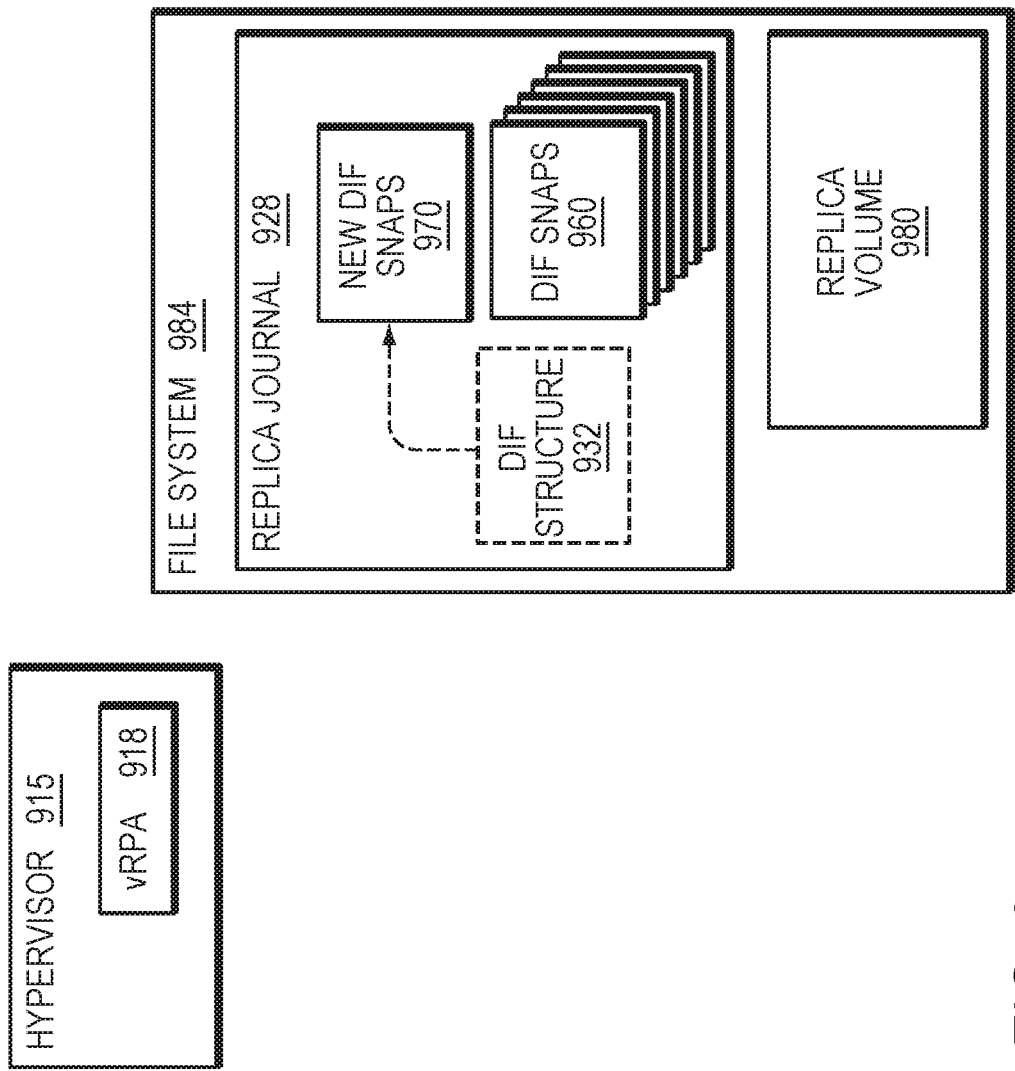
FIG. 9 is a simplified illustration of a creating a differential snapshot, in accordance with an embodiment of the present disclosure.
Figure 10:
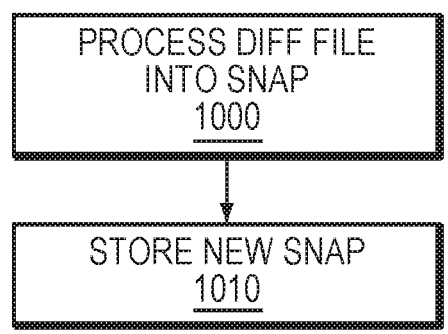
FIG. 10 is a simplified example of a method for creating a differential snapshot, in accordance with an embodiment of the present disclosure.

Refer now to the example embodiments of FIGS. 9 and 10, which illustrate creating a new differential snap. Hypervisor 915. vRPA 918, file system 984, and replica volume 980 perform similar functions as described with like numbers in FIG. 7. At a given point in time, diff structure file 932 may be processed (step 1000) by replica journal 928 to become new diff snap 970. New diff snap 970 represents a snapshot of changes between the latest snapshot image 960 the latest point in time 970. In this embodiment, the volume contains the oldest point in time, i.e. there is a volume at point in time t and a list of differentials from T to T1 which is the first diff file, from T1 to T2 which is the second diff file, with each diff file bringing the image forward in time. New diff snap 970 may be added to diffs snap 960 (step 1010).

In some embodiments the diff structure may be kept in the vRPA memory and not on a file on the file system.

Figure 11:
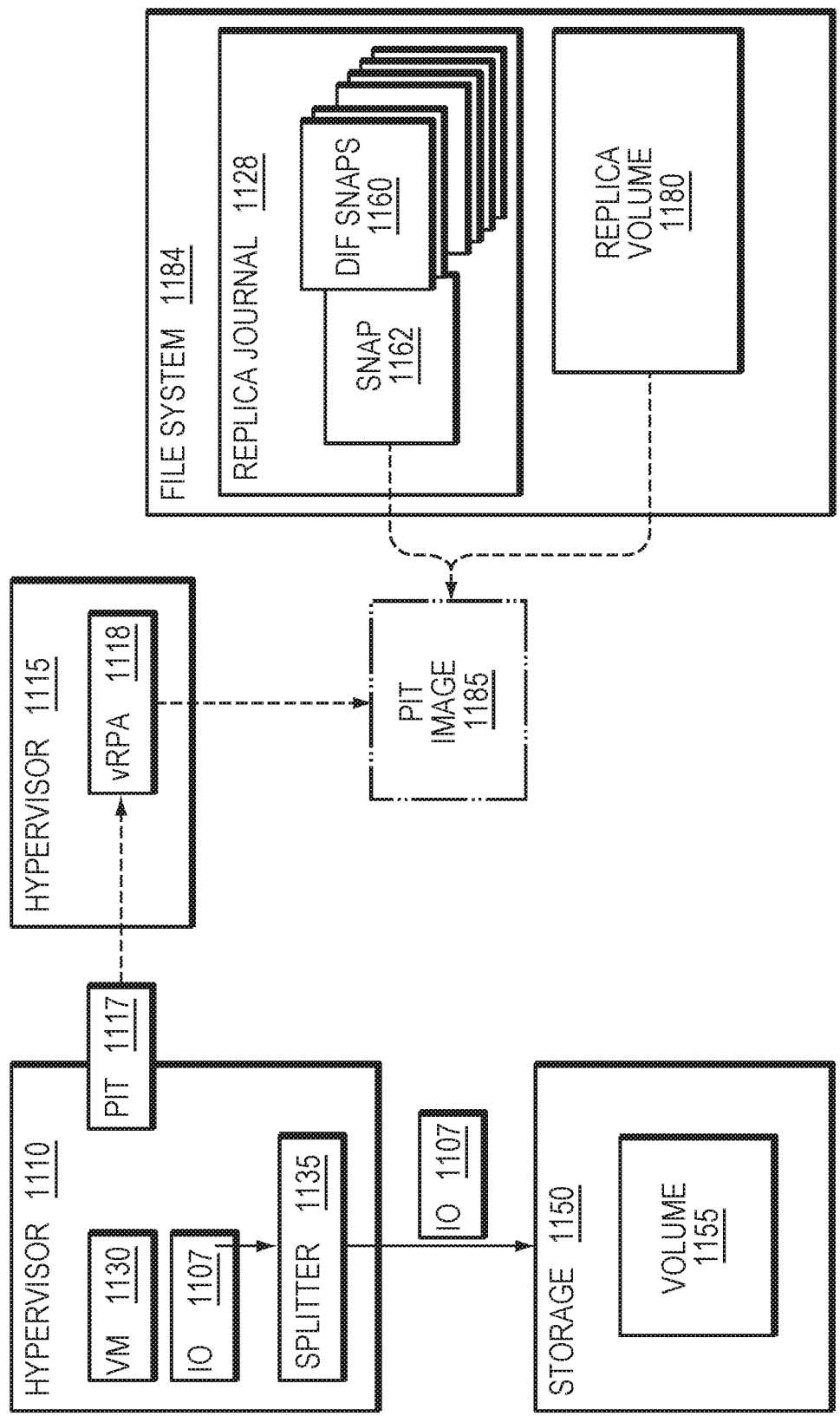
FIG. 11 is a simplified illustration of accessing a Point in Time (PIT) using a differential snapshot, in accordance with an embodiment of the present disclosure.
Figure 12:
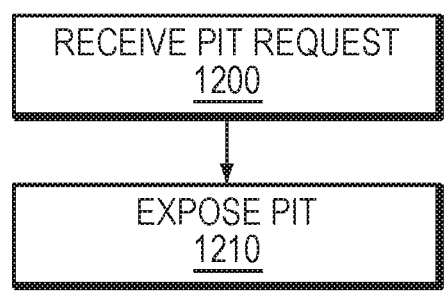
FIG. 12 is a simplified example of a method for accessing a PIT, in accordance with an embodiment of the present disclosure.

Refer now to the example embodiments of FIGS. 11 and 12, which illustrate providing a point in time based on a request. Hypervisor 1110, VM 1130, splitter 1135, storage 1150, volume 1155, file system 1184, and replica journal 1128 perform similar functions as described with like numbers in FIG. 7. vRPA 1118 on hypervisor 1115 receives request for PIT 1107 (step 1200). vRPA 1118 coordinates with hypervisor uses snap 1162 of diff snaps 1160 and replica volume to expose PIT image 1185 in response to PIT request 1117 (step 1210). In this embodiment, the PIT is exposed by configuring the virtual disk meta data file to include the differential files snapshots of the virtual disk.

In many embodiments, such as the example embodiments of FIGS. 11 and 12, the journal may contain a series of differential snapshots. In most embodiments, a hypervisor may use a differential snapshot and the current point in time to instantly provide access to the requested point of time. In some embodiments, there may be a limited on the number of snapshots that may be maintained. In certain embodiments, it may be beneficial to limit the number of snapshots by combining two or more differential snapshots into a single snapshot.

Figure 13:
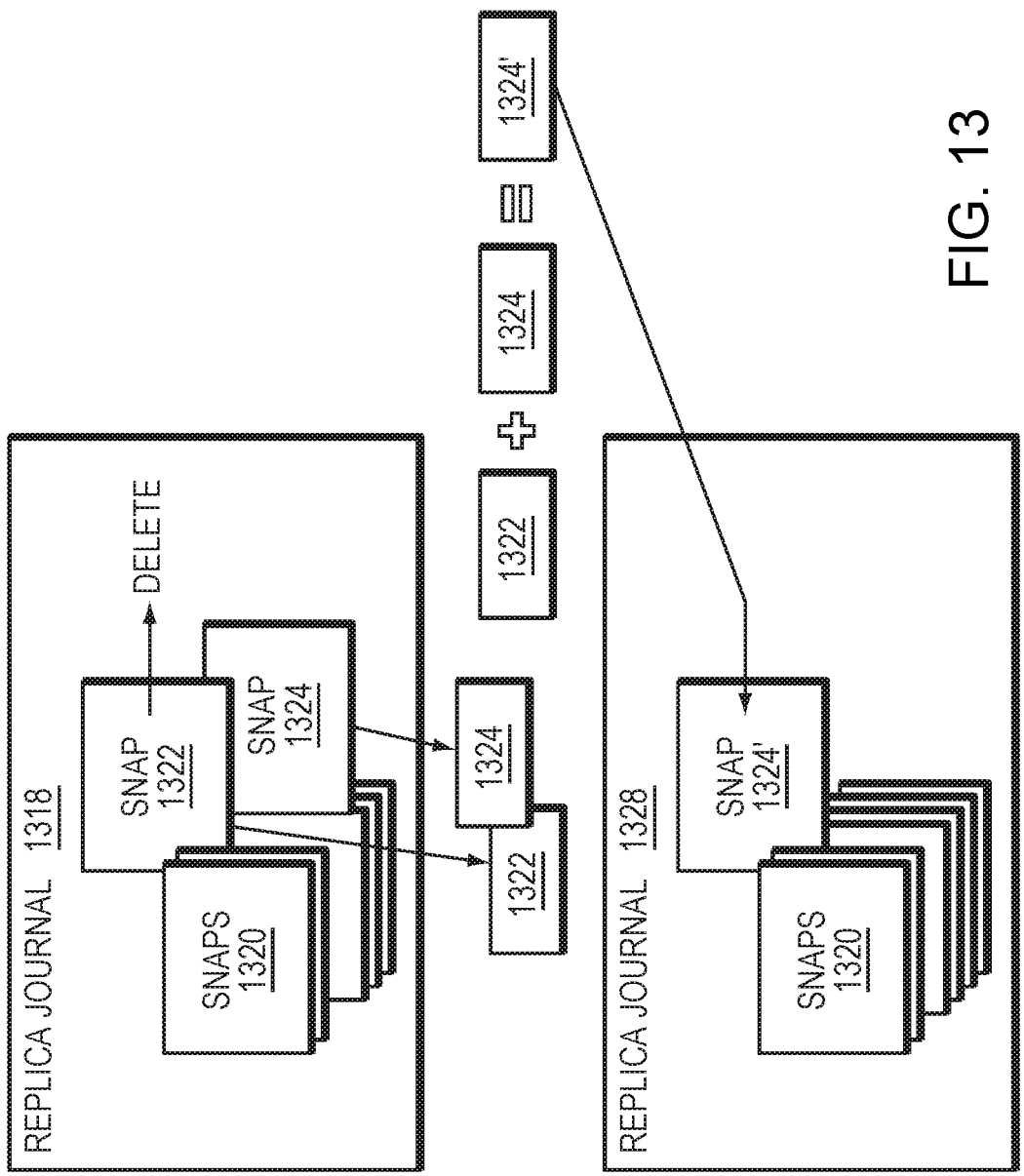
FIG. 13 is a simplified illustration merging differential snapshots, in accordance with an embodiment of the present disclosure.
Figure 14:
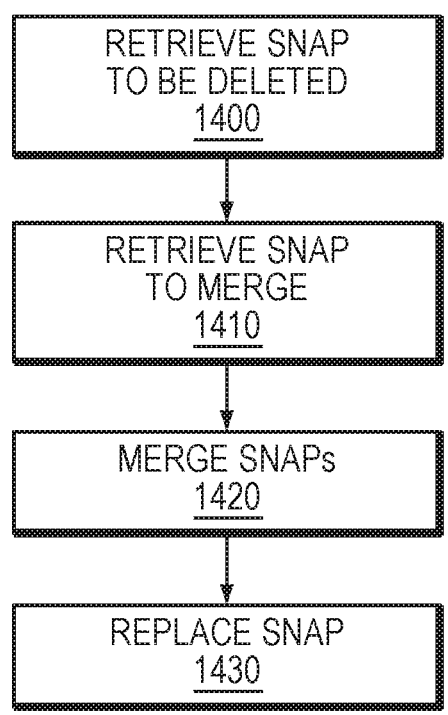
FIG. 14 is a simplified example of merging differential snapshots, in accordance with an embodiment of the present disclosure.

Refer now to the example embodiments of FIGS. 13 and 14, which illustrate combining two differential snapshots. Replica journal 1318 contains snaps 1320. Snaps 1320 include snap 1322 and snap 1324. It is desired to delete snap 1324. Snaps 1322 and 1324 are removed from snaps 1320 (steps 1400 and 1410). Snaps 1322 and 1324 are combined into snap 1324 (step 1420). Snap 1324 is inserted into snaps 1320 in replica journal 1328 (step 1430). Replica journal 1328 and snaps 1360 represent replica journal 1318 and snaps 1320 after snaps 1322 and 1324 have been removed and replaced with snap 1324'.

In certain embodiments, the merging may performed by processing the two diff files and creating a merged diff file. In other embodiments the merging may be performed by requesting the hypervisor to erase a specific snapshot described by the differential file which causes the merge of the files by the hypervisor.

In some embodiments, a snapshot may be merged into the replica volume (1180), i.e. the differential data from the snapshot is applied to the volume and the snapshot is erased, this also may either be done by erasing the first snapshot in the hypervisor, or by performing the merge operation by the DPA.

Figure 15:
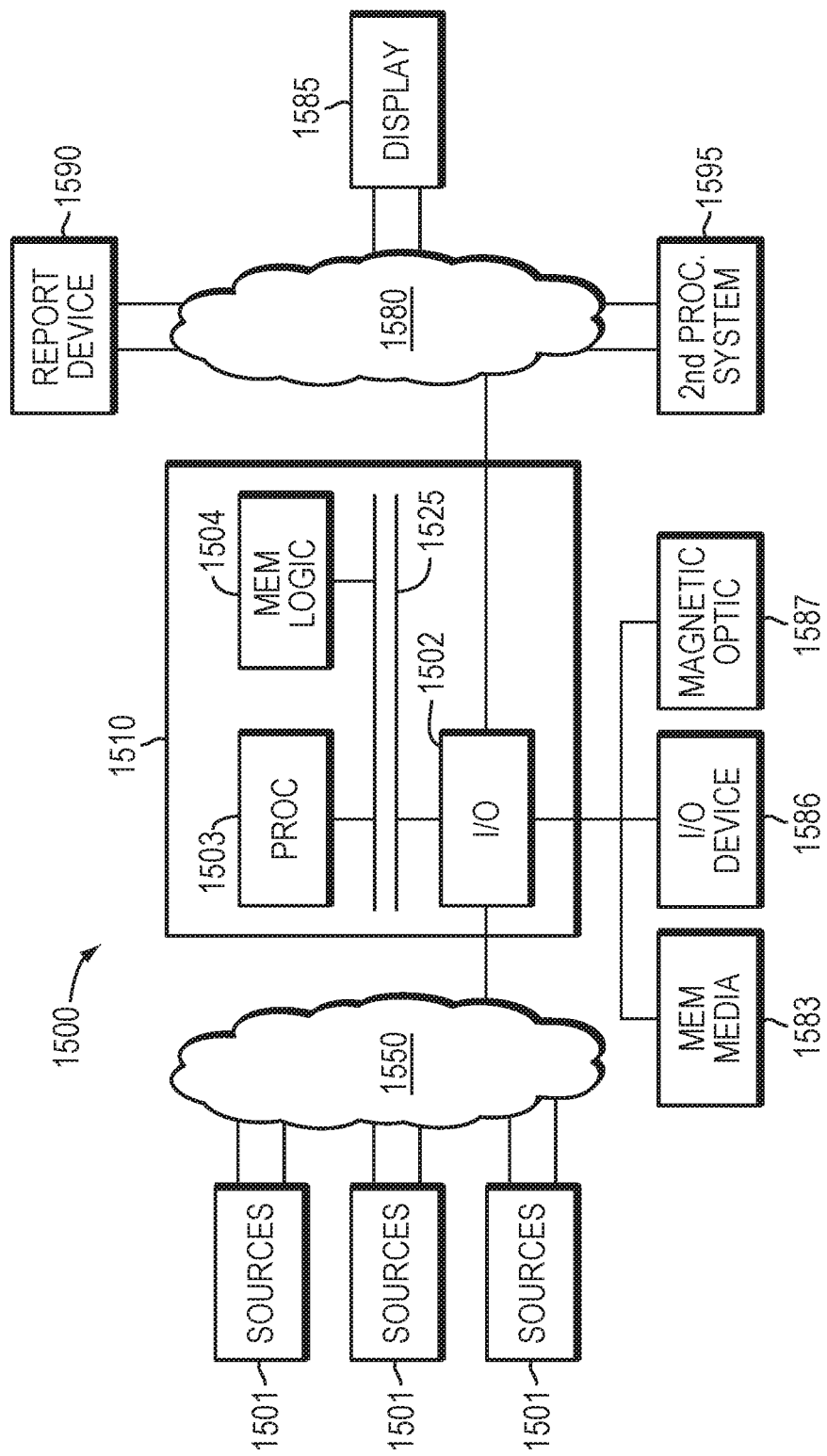
FIG. 15 is an example of an embodiment of an apparatus that may utilize the techniques described herein, in accordance with an embodiment of the present disclosure.
Figure 16:
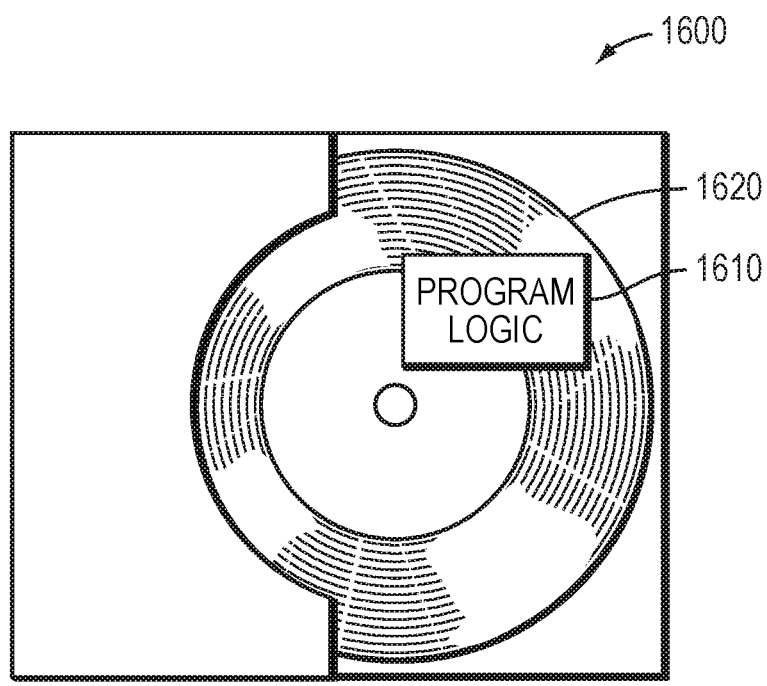
FIG. 16 is an example of a method embodied on a computer readable storage medium that may utilize the techniques described herein, in accordance with an embodiment of the present disclosure.

The methods and apparatus of this invention may take the form, at least partially, of program code (i.e., instructions) embodied in tangible media, such as floppy diskettes, CD-ROMs, hard drives, random access or read only-memory, or any other machine-readable storage medium. When the program code is loaded into and executed by a machine 1500, such as the computer 1510 of FIG. 15, the machine 1500 becomes an apparatus for practicing the invention. When implemented on one or more general-purpose processors, the program code combines with such a processor 1503 to provide a unique apparatus that operates analogously to specific logic circuits. In this embodiment, the computer 1510 is further comprised of an input/output ("IO") interface 1502 and a bus 1525, which couples IO 1502 with memory logic 1504 and processor 1503. IO 1502 serves as an IO interface for a first cloud configuration 1550 and its associated storage devices 1501. In alternate embodiments, there may be additional storage such as memory media 1583 and magnetic optical 1587 coupled to computer 1510 via I/O device 1586. In yet additional embodiments, there could be a second cloud configuration 1580 and its processing system 1595. This second cloud configuration 1580 may have a reporting device 1590 and a display 1585. In this way, a general purpose digital machine can be transformed into a special purpose digital machine. FIG. 16 shows Program Logic 1610 embodied on a computer-readable medium 1620 as shown, and wherein the Logic is encoded in computer-executable code configured for carrying out the reservation service process of this invention and thereby forming a Computer Program Product 1600. The logic 1610 may be the same logic 1610 on memory 1504 loaded on processor 1503. The program logic may also be embodied in software modules, as modules, or as hardware modules. The processor may be one or more processors or one or more virtual processors.

The logic for carrying out the method may be embodied as part of the system described below, which is useful for carrying out a method described with reference to embodiments shown in, for example, FIGS. 4, 6, 8, 10, and 12. For purposes of illustrating the present invention, the invention is described as embodied in a specific configuration and using special logical arrangements, but one skilled in the art will appreciate that the device is not limited to the specific configuration but rather only by the claims included with this specification.

Although the foregoing invention has been described in some detail for purposes of clarity of understanding, it will be apparent that certain changes and modifications may be practiced within the scope of the appended claims. Accordingly, the present implementations are to be considered as illustrative and not restrictive, and the invention is not to be limited to the details given herein, but may be modified within the scope and equivalents of the appended claims.

What is claimed is:

1. A system for data replication, the system comprising:
a replication site having an image;
at least one processor; and
a computer-executable program logic operating in memory, wherein the computer-executable program logic is configured for execution by the at least one processor of:
   receiving at a hypervisor replicated input/outputs ("IOs"), wherein each replicated IO is a copy of an IO for an application of the image on a production site;
   storing each replicated IO in a unique differential structure in a journal at the production site;
   accumulating the differential structures corresponding to the replicated IOs at the production site;
   periodically sending the accumulated differential structures to the replication site;
   storing the replicated IO on the replication site; and
   periodically processing the accumulated differential structures on the replication site so that it becomes a differential snapshot; wherein the differential snapshot includes one or more changes in the IO as compared with a previous replicated IO, and wherein the differential snapshot may be used by the hypervisor to provide instant access to a point in time corresponding to the time when the differential snapshot was created.

2. The system of claim 1 further comprising a data protection appliance (DPA) wherein the storing of an IO to a particular location on the replication site will overwrite previous IO stored in the differential structure to the particular location.

3. The system of claim 1 wherein the differential snapshot is a snapshot able to be processed by the hypervisor to create a point in time image.

4. The system of claim 3 wherein a data protection advisor merges the differential snapshots.

5. The system of claim 1 wherein the logic is further configured for execution of merging two differential snapshots into a single snapshot.

6. The system of claim 5 wherein the logic calls a function in the hypervisor to merge the differential snapshots.

7. A computer program product comprising:
a non-transitory computer readable medium encoded with computer executable program code enabled to run on a replication site having an image, the code configured to enable the execution of:
   receiving at a hypervisor replicated input/outputs ("IOs"), wherein each replicated IO is a copy of an IO for an application of the image on a production site;
   storing replicated IO in a unique differential structure in a journal at the production site;
   accumulating the differential structures corresponding to the replicated IOs at the production site;
   periodically sending the accumulated differential structures to the replication site;
   storing the replicated IO on the replication site; and
   periodically processing the accumulated differential structure on the replication site so that it becomes a differential snapshot; wherein the differential snapshot includes one or more changes in the IO as compared with a previous replicated IO, and wherein the differential snapshot may be used by the hypervisor to provide instant access to a point in time corresponding to the time when the differential snapshot was created.

8. The computer program product of claim 7 wherein a storing of an IO to a particular location on the replication site will overwrite previous IO stored in the differential structure to the particular location.

9. The computer program product of claim 7 wherein the differential snapshot is a snapshot able to be processed by the hypervisor to create a point in time image.

10. The computer program product of claim 9 wherein a data protection advisor merges the differential snapshots.

11. The computer program product of claim 7 wherein the logic is further configured for execution of merging two differential snapshots into a single snapshot.

12. The computer program product of claim 11 wherein the logic calls a function in the hypervisor to merge the differential snapshots.

13. A computer implemented method comprising:
receiving at a hypervisor replicated input/outputs ("IOs"), wherein each replicated IO is a copy of an IO for an application of an image on a production site;
storing each replicated IO in a unique differential structure in a journal at the production site;
accumulating the differential structures corresponding to the replicated IOs at the production site;
periodically sending the accumulated differential structures to the replication site;
storing the replicated IO on the replication site; and
periodically processing the accumulated differential structure so that it becomes a differential snapshot; wherein the differential snapshot includes one or more changes in the IO as compared with previous replicated IO, and wherein the differential snapshot may be used by the hypervisor to provide instant access to a point in time corresponding to the time when the differential snapshot was created.

14. The method of claim 13 wherein a storing of an IO to a particular location on the replication site will overwrite previous IO stored in the differential structure to the particular location.

15. The method of claim 13 wherein the differential snapshot is a snapshot able to be processed by the hypervisor to create a point in time image.

16. The method of claim 15 wherein a data protection advisor merges the differential snapshots.

17. The method of claim 13 wherein the computer implemented method further comprises merging two differential snapshots into a single snapshot.

18. The method of claim 17 wherein the computer implemented method comprises calling a function in the hypervisor to merge the differential snapshots.

* * * * *